Dec. 7, 1965     J. PICKLES     3,222,025
BUCKET SEAT ADJUSTER
Filed April 23, 1964     3 Sheets-Sheet 1
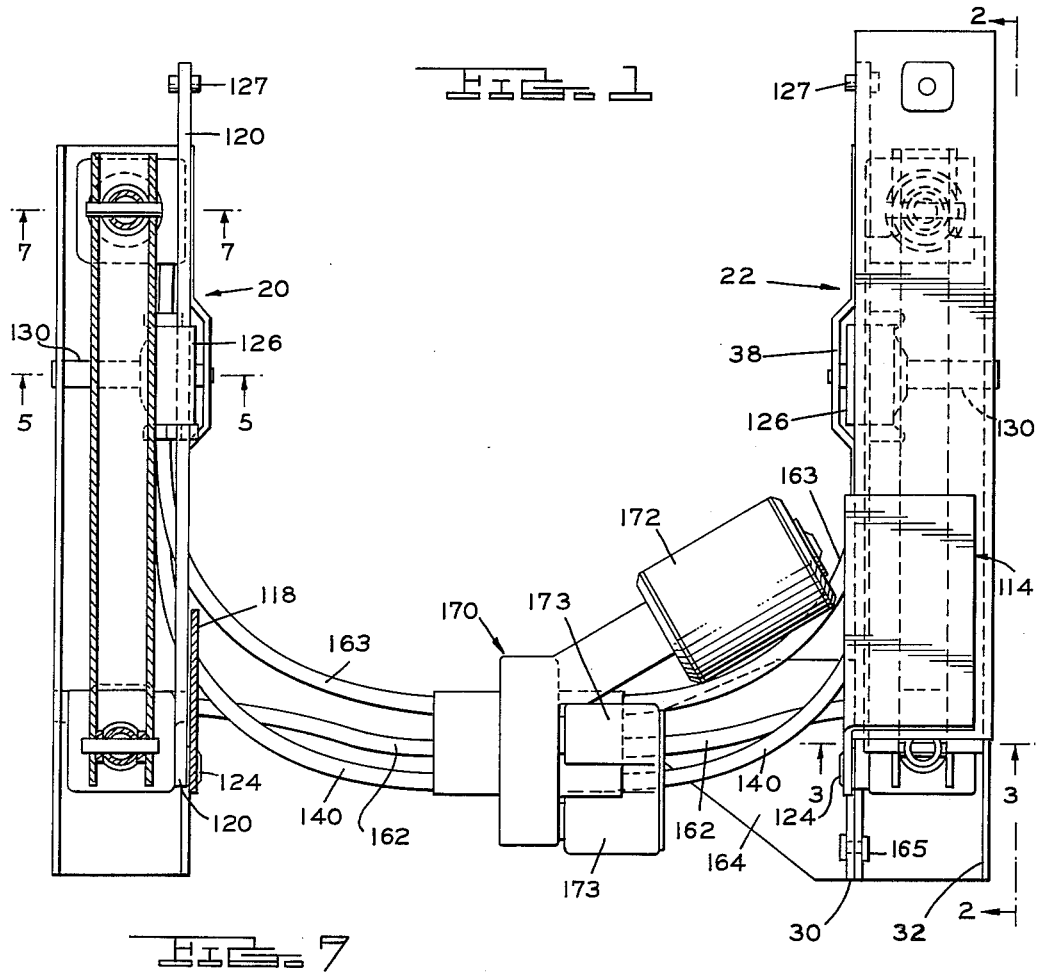
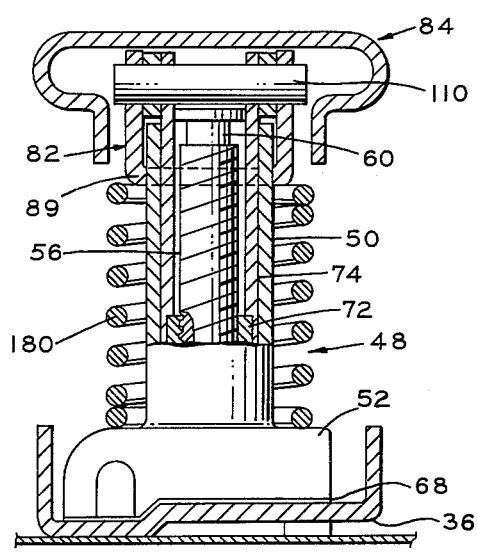
INVENTOR.
JOSEPH PICKLES
BY
*Whittemore, Hulbert*
*& Belknap*
          ATTORNEYS

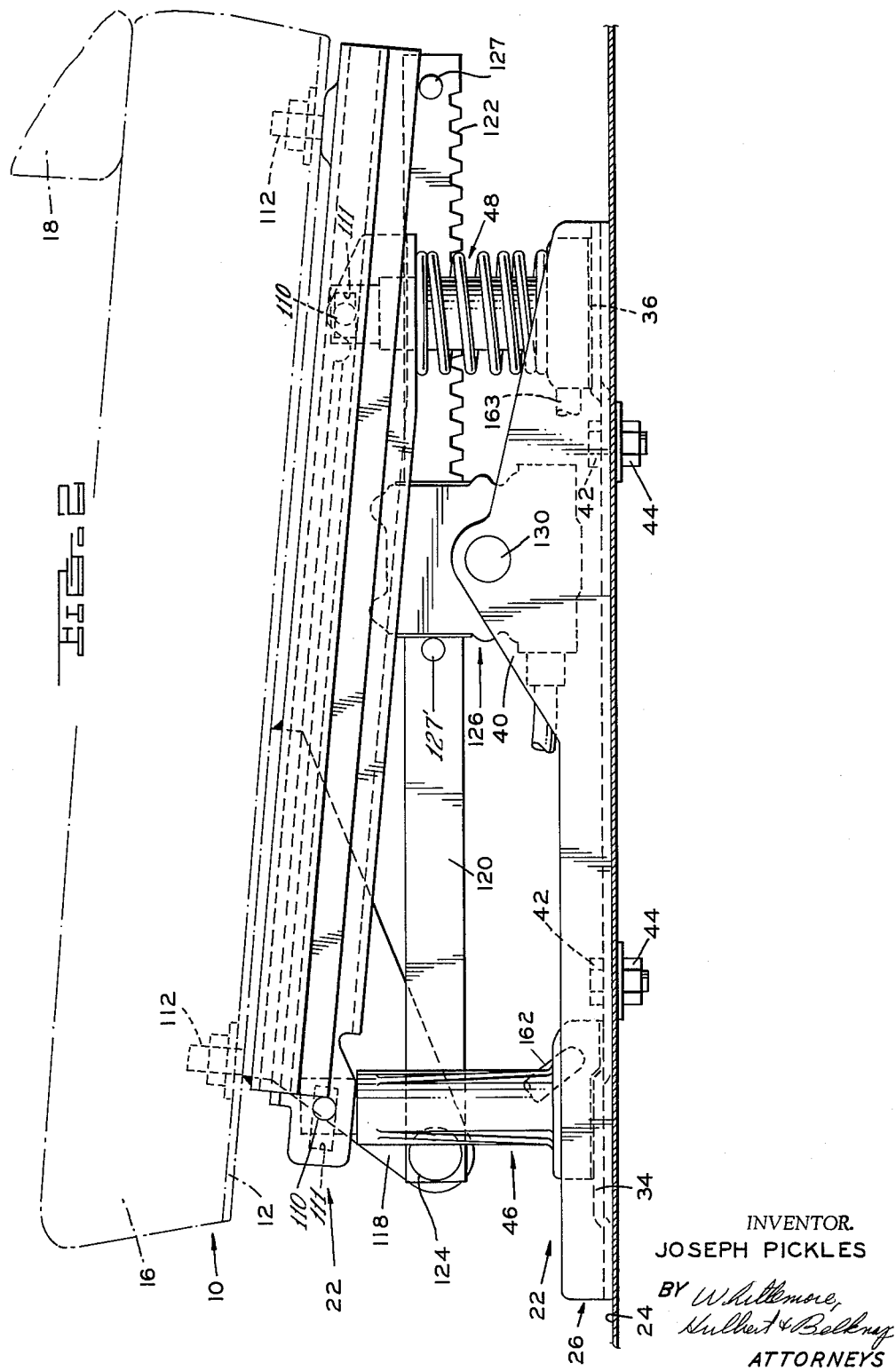

Dec. 7, 1965  J. PICKLES  3,222,025
BUCKET SEAT ADJUSTER
Filed April 23, 1964  3 Sheets-Sheet 3
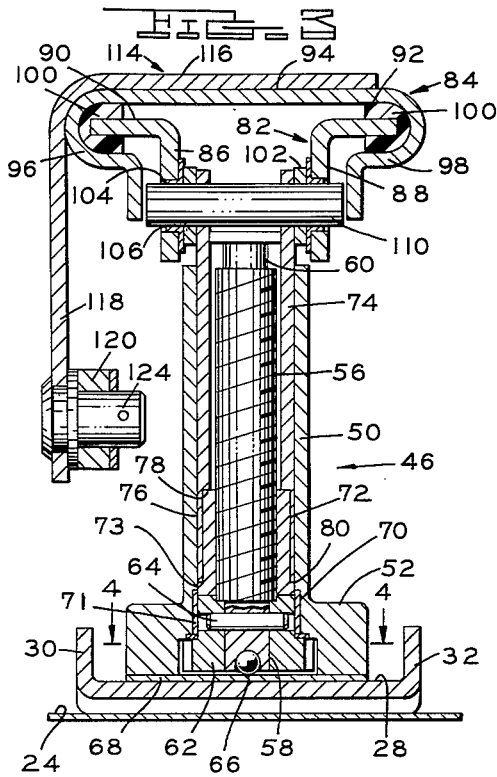
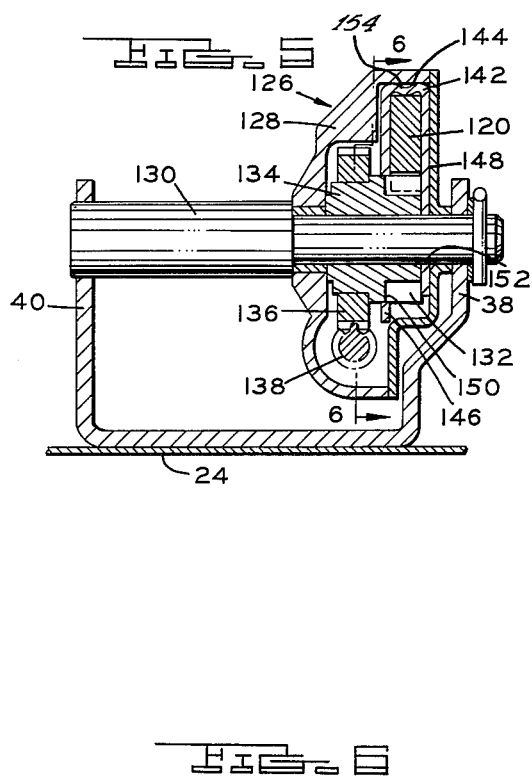
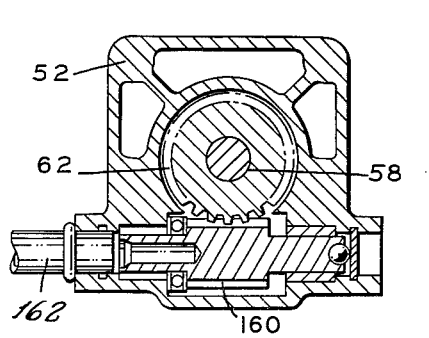
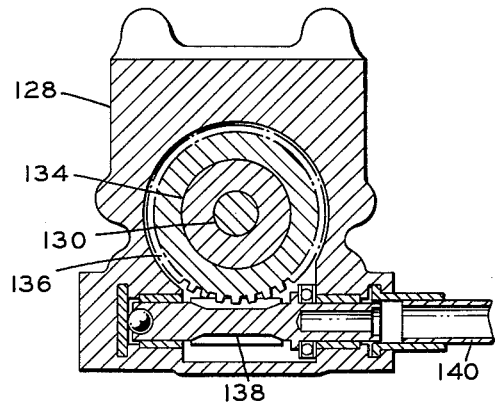
INVENTOR.
JOSEPH PICKLES
BY Whittemore, Hulbert
& Belknap
ATTORNEYS

United States Patent Office 3,222,025
Patented Dec. 7, 1965

3,222,025
BUCKET SEAT ADJUSTER
Joseph Pickles, Dearborn, Mich., assignor to Ferro Manufacturing Corporation, a corporation of Michigan
Filed Apr. 23, 1964, Ser. No. 361,964
18 Claims. (Cl. 248—397)

This invention relates to a seat adjuster and more particularly relates to a power-operated seat adjusting mechanism.

The automobile industry is increasingly utilizing power seat adjusting mechanisms of various types. Many power-operated seat adjusting mechanisms including complicated actuating linkages have been devised to permit movement of a vehicle seat in a plurality of directions including two-way, four-way, or six-way adjustment of the seat. It will be appreciated that the most satisfactory service is obtained when the seat adjusting mechanism employs a minimum of operating parts. Further, a more economical version of a power-operated seat adjusting mechanism results by utilizing quality manufacturing in a few of the important elements of the mechanism. In the present case, a track assembly is employed at both sides of a one-passenger seat of the so-called "bucket" type, with the component parts of the entire seat adjusting mechanism being located in the limited space provided between the floor pan and the bottom of the "bucket" seat and being of quality manufacture to insure maximum response of the seat adjusting mechanism to power application thereto.

It is an object of the present invention to provide a power-operated seat adjusting mechanism particularly adapted for a single passenger "bucket" type of seat, wherein the seat is located in close proximity to and spaced from the floor pan of the vehicle at one side of the raised drive shaft tunnel of the vehicle, with the entire seat adjusting mechanism being located in the space underneath the seat.

Another object of the present invention is to provide a power-operated seat adjusting mechanism comprising a pair of track assemblies at opposite side edges of the seat which are spaced above the floor pan of the vehicle closely adjacent the bottom of the seat and a power transmission including a motor fixedly carried by the front end portion of the base supporting one of the track assemblies in a raised position.

Still another object of the present invention is to construct and arrange a power-operated six-way seat adjusting mechanism with a minimum number of quality manufactured parts or elements.

A further object of the present invention is to provide a power-operated seat adjusting mechanism which is compactly arranged to economically utilize the limited space provided between a vehicle seat and the floor pan.

A still further object of the present invention is to provide a seat track construction having two separate side track assemblies with independent actuating mechanisms thereon for moving the side track assemblies in a desired manner, the corresponding actuating mechanisms on each side track assembly being simultaneously actuated by a motor disposed therebetween.

Another object of the present invention is to provide a seat track construction having spaced side track assemblies with separate lead screw mechanisms incorporated at the front and rear of each track assembly for actuating each of the side track assemblies in the desired manner.

Still another object of the present invention is to provide a seat adjuster mechanism comprising a base adapted to be securely fastened to the floor of a vehicle and extending from front to rear thereof, a track assembly spaced above and arranged substantially parallel to the base comprising a track and a slide for the seat, said slide being movable with respect to the track, a pair of substantially vertically extending actuating mechanisms mounted on the fixed base adjacent the front and rear ends thereof in the space between the base and the track assembly for supporting the track assembly above the base, said actuating mechanisms each comprising a tubular housing fixed to the base, a threaded support member mounted in the housing for rotation only and spaced from the walls thereof, a threaded nut mounted on the support member in the housing in the space between the support member and the nut for axial movement with respect thereto, a tubular elongated element in the housing surrounding the support member in the space between the housing and the support member and having a surface abutting the nut member for movement of the elongated element by the nut member, means connecting the elongated element of each mechanism to the track, and power operated means for driving the support member of each of the actuating mechanisms in rotation to axially displace the nut and the elongated element to vertically position the track assembly.

A further object of the present invention is to provide a seat adjusting mechanism of the aforementioned type wherein a downwardly extending bracket is connected to the slide, a substantially horizontally extending rack connected on the front end thereof to the bracket, a pinion in mesh with the teeth of the rack, and a rack retainer mounted for swinging movement about the axis of the pinion, said rack retainer having means slidably engaging the rear edge of the rack to retain it in proper mesh with the pinion, said power-operated means being drivingly connected to the pinion to move the rack and slide horizontally.

A still further object of the present invention is to provide a structure of the aforementioned type wherein the power-operated actuating means includes a single reversible motor which is utilized in conjunction with selectively operable control means for effecting the desired adjustments.

It is thus another object of this invention to provide a simplified low cost structure of the aforementioned type having certain advantages contributing to efficiency, reliability and long life as well as ease of maintenance.

Further objects and advantages of the present invention will be apparent from the following description, reference being had to the accompanying drawings wherein a preferred form of the present invention is clearly shown.

FIGURE 1 is a plan view of the power-operated seat adjusting mechanism, with the seat and part of the frame removed.

FIGURE 2 is a side elevation of the power-operated seat adjusting mechanism looking in the direction of arrows 2—2 in FIGURE 1.

FIGURE 3 is a sectional view taken substantially on the line 3—3 of FIGURE 1.

FIGURE 4 is a sectional view taken substantially on the line 4—4 of FIGURE 3.

FIGURE 5 is a sectional view taken substantially on the line 5—5 of FIGURE 1.

FIGURE 6 is a sectional view taken substantially on the line 6—6 of FIGURE 5.

FIGURE 7 is a sectional view taken substantially on the line 7—7 of FIGURE 1.

The present invention relates to a seat supporting and adjusting mechanism designed primarily for use in supporting a so-called "bucket" type of seat of an automobile. The seat track adjusting mechanism comprises a pair of track structures located at opposite edges of the seat. The seat is located at one side of the drive shaft tunnel of the vehicle. It will be appreciated that in modern day automobiles the space provided between the bottom of the "bucket" type of seat and the floor pan of the vehicle is relatively limited and it is essential that the entire adjusting mechanism of the seat track unit be located within this limited space. The adjustments contemplated are essentially up and down movement of the front edge of the seat, up and down movement of the rear edge of the seat, and substantially front to rear adjustment of the seat. It will, of course, be understood that simultaneous adjustment of the front and rear edges of the seat either upwardly or downwardly results in vertical adjustment of the seat as a unit whereas adjustment of one edge independently of the other results primarily in effecting a tilting adjustment of the seat.

Referring now to the drawings, FIGURE 2 illustrates a single passenger seat 10 of the "bucket" type used in modern automobiles. The seat 10 is provided with a frame 12 which has a seat cushion 16 and a seat back 18 mounted thereon. The frame 12 is supported on two parallel spaced-apart side track assemblies 20 and 22 which are fixed to the floor pan 24. It will be appreciated that in certain vehicles the floor panel may be suitably dished out or contoured to enable both side track assemblies to be supported at an angle relative to the floor panel.

Each of the side track assemblies 20 and 22 are spaced above the floor pan 24 in close relationship to the bottom of the seat 10. Each of the seat track assemblies is of substantially identical construction and therefore the same numerals will be utilized to designate like parts in assemblies 20 and 22. As an example, seat track assembly 22 is provided with an elongated channel-shaped base member 26 which comprises a substantially flat central portion or web 28 having flanges 30 and 32 extending laterally upwardly from the web 28 as shown in FIGURE 3.

The web 28 of each base member 26 has a pair of relatively short, elongated raised portions 34 and 36 adjacent the front and rear of the base member 26. Intermediate the ends of the base member 26, the flanges 30 and 32 are provided with upwardly extending legs 38 and 40 respectively of substantially identical shape. Leg 40 lies in substantially the same plane as the flange 32 while the leg 38 is offset laterally from the plane of the flange 30 as best illustrated in FIGURE 1. The base member 26 is connected to the floor panel or pan 24 by means of a pair of threaded bolts 42 and nuts 44 as indicated in FIGURE 2.

A pair of substantially vertically extending actuating mechanisms 46 and 48 are provided adjacent the front and rear ends of each of the track members 26 substantially above the raised portions 34 and 36 respectively. Each of the actuating mechanisms 46 and 48 are of substantially identical construction and therefore the same numerical designations will be utilized to designate like parts. Referring now to actuating mechanism 46, said mechanism comprises a substantially tubular housing 50 which is provided on the bottom end thereof with a laterally extending base 52 which is mounted on the raised portion 34 by appropriate fastening means not illustrated. Centrally disposed in the tubular housing 50 is a threaded support member 56 which is provided on opposite ends thereof with reduced non-threaded extensions 58 and 60. The support member 56 is mounted in the housing 50 for rotation only. The non-threaded extension 58, which is located at the lower end of the threaded support member 56 is appropriately connected to a worm gear 62 by means of a laterally extending pin 64. The pin 64 extends through aligned openings provided in the worm gear 62 and the extension 58. The extension 58 is provided with a ball bearing support 66 which engages a wear or shim plate 68. A tubular thrust bushing 70 is interposed between the reduced portion 71 of the worm gear 62 and the base 52.

Mounted on the threaded support member 56 in the space between the support member 56 and the tubular housing 50 is an axially movable non-rotatable threaded nut 72, the side edges of which are spaced from the interior wall of the tubular housing 50. The lower end of the threaded nut 72 is provided with a flange 73 which is in engagement with the interior wall of the tubular housing 50. A tubular non-threaded element 74 is also located in the tubular housing 50 with the outer surface thereof in contact with the interior wall of the tubular housing 50.

The non-threaded tubular element 74 is of uniform inside diameter with the exception that the bore of the lower end portion 76 is enlarged in diameter to provide a relatively thin wall portion which fits into the space between the nut 72 and the tubular housing 50 as illustrated in FIGURE 3. The element 74 includes an internal abutment surface 78 which engages the top of the nut 72. The bottom end wall or surface 80 of the tubular element 74 engages the top surface of the flange 73. The elongated element 74 extends beyond the top surface of the tubular housing 50 and is adapted to be moved axially upon axial movement of the nut 72.

Each of the track assemblies 20 and 22 includes an inverted channel-shaped elongated track 82 and an elongated slide 84 movably mounted on the track 82. The channel-shaped track 82 comprises a pair of vertically extending side flanges 86 and 88 which are connected by a horizontal web 89. The upper longitudinal edges of the side flanges 86 and 88 are provided with laterally extending outwardly turned flange portions 90 and 92 respectively. The movable slide 84 includes a substantially flat base 94 having side portions 96 and 98 which hook over the flange portions 90 and 92 of the track 82 and are slidably supported on preformed blocks of low friction material 100 fixed to the flanges 90 and 92. The slide 84 is mounted on the track 82 after the track 82 has been mounted on the actuating mechanisms 46 and 48.

Each track assembly 20 and 22 is supported above the floor panel 24 by the vertically extending actuating mechanisms 46 and 48 adjacent the front and rear of the track assembly. Referring once again to FIGURE 3, a spacer 102 extends around the upper end of the elongated tubular element 74 spaced from and above the tubular housing 50. The side flanges 86 and 88 of the elongated stationary track 82 are provided with laterally extending openings 104 which receive wear bushings 106. In addition, openings aligned with the openings in the bushings 106 are provided in the spacer and in the tubular element 74. An elongated pin 110 extends through the bushings in the side flanges 86 and 88, through the front spacer 102 and the elongated slots 110 provided in the opposite sides of the tubular element 74 so as to mount one end of the stationary track 82 with respect to the corresponding actuating mechanism. The pin 110 is effective to hold the track 82 against substantial lengthwise displacement although it should be appreciated that a relatively small amount of displacement is permitted due to the provisions of the slots 111 in order to prevent binding of the parts when the front and rear edges of the seat are lowered or raised independently of the other.

The seat 10 is adapted to be connected to the slide 84 by means of a plurality of threaded fasteners 112 as best illustrated in FIGURE 2. A bracket is provided with an arm 116 which is secured to the front end portion of the slide 84 by welding or other suitable means. The bracket 114 includes a downwardly extending substantially vertical arm 118 as best illustrated in FIGURES 2 and 3.

The lower edge portion of the arm 118 has connected thereto an elongated rack 120 which is provided with a plurality of rack teeth 122 on the lower edge thereof. The upper edge of the rack is flat as will subsequently appear. The rack 120 is connected to the arm 118 by means of a pivot pin 124. The rack 120 extends through a pinion device 126 as will be subsequently described. The rear end of the rack 120 is free and is provided with a laterally extending slotted spring pin 127 which is used for a purpose to be subsequently described.

The power actuator assembly for moving the seat 10 fore and aft, that is, horizontally, includes the rack 120 and pinion device 126. The device 126 includes a housing 128 which is rotatably mounted on an elongated horizontal clevis pin 130 which has the opposite ends thereof mounted for rotation in the upwardly extending legs 38 and 40 of the base member 28. The pin or shaft 130 is provided with a pinion 132 which is provided with an annular bearing 134 at one side thereof. The integral pinion and bearing element is secured to the reduced portion of the pin 130 by means not shown. A worm gear 136 is mounted on and secured to the bearing 136 and is in mesh with a worm 138. The worm 138 is mounted in the housing 128 and is driven by suitable means such as, for example, a flexible drive cable 140 which is adapted to be driven in forward and reverse directions by suitable means such, for example, as an electrical motor which will be subsequently described.

The worm gear 136 is keyed or otherwise secured to the bearing portion 134 of the pinion 132 which is in meshed engagement with the elongated rack 120. As mentioned previously, one end of the rack 120 is pivoted as indicated at 124 to the arm 118. As will be apparent, rotation of the flexible drive cable 140 drives the worm 138 which in turn drives the worm gear 136 and pinion 132 and the pinion 132 drives the rack 120 in order to move the seat 10 fore and aft. Since the seat 10 is arranged on an inclined track, the free end of the rack 120 is adapted to swing in an arcuate path. In order to permit this swinging movement the rack 120 is required to combine longitudinal movement with swinging movement about the axis of the pinion 132. The housing 128 is cut away to provide for the aforesaid movement of the rack 120. In order to maintain the rack 120 in properly meshed relation with the pinion 132 during the combined longitudinal swinging movement, a rack retainer 142 is provided. The rack retainer 142 is formed of sheet metal formed into the U-shaped cross-sectional configuration as indicated in FIGURE 5, and comprises a web portion 144 and leg portions 146 and 148. One of the leg portions, as for example, the leg portion 146 is provided with a relatively large opening 150 of a size to receive the pinion 132 for rotation therein. The other leg portion 148 is provided with a smaller opening 152 shaped to receive the portion of the shaft beyond one end of the pinion 132, as best illustrated in FIGURE 5. The rack retainer 142 is accordingly mounted for swinging movement about the axis of the shaft or pin 130.

The web portion 144 of the rack retainer 142 is substantially elongated and is provided with a pair of bearing portions 154 which are engageable with the smooth straight back edge of the rack 120 although only one bearing portion 154 is illustrated in FIGURE 5. The bearing portions 154 are preferably formed by inwardly dimpling the material of the web 144 so as to provide smoothly rounded bearing portions adapted to have minimum area contact with the rack 120. It should be understood that the bearing portions 154 are widely spaced substantially equal distances from a line passing through the axes of the openings 146 and 152 and perpendicular to the length of the rack 120. Accordingly, as the rack 120 swings in the course of its operation adequate forces are applied to the rack retainer 142 to cause it to swing in conformity with the swinging component of the movement of the rack 120 and thus to avoid any tendency of the rack retainer 142 to bind.

The bearing portions 154 may be of generally spherical configuration as suggested in FIGURE 5, or, to increase the area of contact, they may be of cylindrical cross section extending transversely of the web 144 between the legs 146 and 148. With the foregoing construction, the rack 120 is retained against radial displacement with respect to the pinion 132 and is thus maintained always in the proper condition of mesh, despite its required longitudinal and swinging movement.

Referring once again to FIGURES 3 and 4, which shows one of the front actuating mechanisms 46, the worm gear 62 is in mesh with a worm 160 which is appropriately mounted in the tubular housing 50, the worm 160 being driven by suitable means such for example as a flexible drive cable 162 (one cable 162 for each track assembly) which is adapted to be driven in forward and reverse directions by suitable means as will subsequently be described so as to raise or lower the front end of the corresponding track assembly 20 or 22. Each of the rear actuating mechanisms 48 is provided with a flexible drive cable 163.

Referring now to FIGURE 1, a motor bracket 164 is fixedly connected to flange 30 of the base member 28 of the track assembly 22 by fastening means 165. A multiple drive unit 170 is appropriately mounted on the bracket 164. Means for driving the multiple drive unit 170 includes a single reversible drive motor 172. A multiple drive unit and motor assembly suitable for the present invention is illustrated in the Pickles Patent 2,886,094 entitled "Seat Adjusting Mechanism" and in particular in FIGURES 12–14 thereof. The single reversible drive motor 172 is utilized in conjunction with three selectively solenoid operable control means 173 of the drive unit 170 for effecting the desired adjustments as is more fully disclosed in the Pickles patent. The three drive cables 140, 162 and 163 for each track assembly 20 and 22 are interposed between the corresponding actuating mechanisms and the multiple drive unit 170 as best illustrated in FIGURE 1.

In operation, the seat 10 may be adjusted horizontally by manipulation of a suitable mechanism that energizes the electrical motor 172 and the appropriate solenoid operated clutch element, not shown, to drive the corresponding flexible drive cables 140 in rotation so as to rotate the worms 138 and the corresponding worm gears 136. As a result thereof, the pinions 132 of each track assembly are rotated to effect longitudinal movement of the racks 120. Thus, the racks 120 are moved horizontally while undergoing swinging movement as mentioned previously and accordingly move the seat 10 fore or aft depending on the direction of rotation of the cables 140.

Suitable control mechanism also permits individual or simultaneous actuation of the vertically movable nut means provided on the rotatable screw supporting members 56 upwardly or downwardly so that the seat 10 may be uniformly elevated or the front or back of the seat 10 may be individually elevated by actuation of the motor 172 and the corresponding solenoid operated clutch element.

Assuming that it is desirable to lift the front of the seat 10, the motor 172 is energized and the appropriate solenoid operated clutch element is actuated. As a result thereof, the drive cables 162 are driven in rotation so as to rotate the worms 160 and the worm gears 62. As a result thereof the threaded support members 56 are rotated which in turn displace the nuts 72 and the tubular elements 74. Movement of the tubular element 74 raises or lowers the front end portion of the track assemblies depending on the direction of rotation of the cables 162.

When it is required to raise the back edge of the seat 10 the suitable control mechanism is actuated which drives the motor 172 and the corresponding solenoid operated clutch mechanism. As a result thereof the drive cables 163 are rotated to drive the corresponding worms, worm gears, threaded support members, nuts and the non-threaded elements of the rear actuating mechanisms 48. All of the operating mechanisms are conventionally reversible to permit reverse movement of the seat 10.

As mentioned previously each rack 120 is provided with a pin 127 at the rear end thereof. In addition each rack is provided with a second slotted spring pin 127' at the forward side of the device 126 as illustrated in FIGURE 2. The pins 127 and 127' serve as stop abutments engageable with the housings 128 for limiting the movement of the racks 120.

Each of the rear actuating mechanisms 48 is provided with a counter balance coil spring 180 which surrounds the housing of the actuating mechanism for balancing as much of the dead load as is possible. The spring 180 is interposed between the bottom web 89 of the fixed track 82 and the top of the flange 52 as illustrated in FIGURE 7.

It should be appreciated that some lost motion or play is provided between the pins 110 and the fixed tracks 82 in order to prevent binding of the seat and the actuating mechanisms when one end of the seat 10 is operated independently of the other.

The drawings and the foregoing specification constitute a description of the improved bucket seat adjuster in such full, clear, concise and exact terms as to enable any person skilled in the art to practice the invention, the scope of which is indicated by the appended claims.

What I claim as my invention is:

1. A seat adjuster mechanism comprising a base adapted to be securely fastened to the floor of a vehicle and extending from front to rear thereof, a track assembly spaced above and arranged substantially parallel to said base comprising a track and a slide for the seat, said slide being movable with respect to said track, a pair of substantially vertically extending actuating mechanisms mounted on said fixed base adjacent the front and rear ends thereof in the space between said base and track assembly for supporting said track assembly above said base, said actuating mechanisms each comprising a threaded support member and a threaded nut member mounted on said threaded support member for relative movement therebetween, first means operatively connecting one of said members of each mechanism to said track, second means operatively connecting the other member to said fixed base, said first means being effective to hold said track against substantial lengthwise displacement, and power operated means to drive the other member of each mechanism with respect to the corresponding member to vertically position said track and said slide.

2. A seat adjuster mechanism comprising a base adapted to be securely fastened to the floor of a vehicle and extending from front to rear thereof, a track assembly spaced above and arranged substantially parallel to said base comprising a track and a slide for the seat, said slide being movable with respect to said track, a pair of substantially vertically extending non-pivotable actuating mechanisms mounted on said fixed base adjacent the front and rear ends thereof in the space between said base and track assembly for supporting said track assembly above said base, said actuating mechanisms each comprising a threaded support member and a threaded nut member mounted on said threaded support member for relative movement therebetween, first means operatively connecting the nut member of each mechanism to said track, second means mounting said support member of each mechanism on said base for rotation only, said first means being effective to hold said track against substantial lengthwise displacement, and power operated means for driving the support member of each mechanism in rotation with respect to the corresponding nut member to vertically position said track and said slide.

3. A seat adjuster mechanism comprising a base adapted to be securely fastened to the floor of a vehicle and extending from front to rear thereof, a track assembly spaced above and arranged substantially parallel to said base comprising a track and a slide for the seat, said slide being movable with respect to said track, a pair of substantially vertically extending actuating mechanisms mounted on said fixed base adjacent the front and rear ends thereof in the space between said base and track assembly for supporting said track assembly above said base, said actuating mechanisms each comprising a tubular housing fixed to said base, a threaded support member mounted in said housing for rotation only, a threaded nut mounted on said support member in said housing for relative movement therebetween, a tubular elongated element surrounding said support member and having a surface abutting said nut, means connecting the elongated element of each mechanism to said track, said means being effective to hold said track against substantial lengthwise displacement, and power operated means for driving said support member in rotation to axially displace said nut and elongated element to vertically position said track and said slide.

4. A seat adjuster mechanism comprising a base adapted to be securely fastened to the floor of a vehicle and extending from front to rear thereof, a track assembly spaced above and arranged substantially parallel to said base comprising a track and a slide for the seat, said slide being movable with respect to said track, a pair of substantially vertically extending actuating mechanisms mounted on said fixed base adjacent the front and rear ends thereof in the space between said base and track assembly for supporting said track assembly above said base, said actuating mechanisms each comprising a tubular housing fixed to said base, a threaded support member mounted in said housing for rotation only and spaced from the walls thereof, a threaded nut mounted on said support member in said housing in the space between said support member and said nut for axial movement with respect thereto, a tubular non-threaded elongated element in said housing surrounding said support member in the space between said housing and said support member and having a surface abutting said nut member for movement of said elongated element by said nut member, means connecting the elongated element of each mechanism to said track, said means being effective to hold said track against substantial lengthwise displacement, and power operated means for driving said support member in rotation to axially displace said nut and said elongated element to vertically position said track and said slide.

5. The seat adjuster mechanism defined in claim 4 wherein means including a rack and pinion is provided for moving said slide horizontally.

6. The seat adjuster mechanism defined in claim 4 wherein a downwardly extending bracket is connected to said slide, a horizontally extending rack connected on one end to said bracket, a pinion in mesh with the teeth of said rack, and a rack retainer mounted for swinging movement about the axis of said pinion, said rack retainer having means slidably engaging the rear edge of said rack to retain it in proper mesh with said pinion, said power operated means being drivingly connected to said pinion to move said rack and slide horizontally.

7. A seat adjuster mechanism comprising a base adapted to be securely fastened to the floor of a vehicle and extending from front to rear thereof, a track assembly spaced above and arranged substantially parallel to said base comprising a track and a slide for the seat, said slide being movable with respect to said track, a pair of substantially vertically extending actuating mechanisms mounted on said fixed base adjacent the front and rear ends thereof in the space between said base and track assembly for supporting said track assembly above said base, said actuating mechanisms each comprising a threaded support member and a threaded nut member mounted on said threaded support member for relative movement therebetween, means operatively connecting one of said members of each mechanism to said track and the other member to said fixed base, power operated means to drive the other member of each mechanism with respect to the corresponding member to vertically position the track assembly, a downwardly extending bracket connected to said slide, a horizontally extending rack pivotally connected on one end to said bracket, said rack having teeth along one edge and a straight rear edge opposite and parallel to its toothed edge, a pinion in mesh with the teeth on said rack, and a rack retainer mounted for swinging movement about the axis of said pinion, said rack retainer having means slidably engaging the straight rear edge of said rack to retain it in proper mesh with said pinion while providing for angular movement about the axis of said pinion as well as longitudinal movement thereof resulting from rotation of said pinion, and drive means operatively connected to said pinion.

8. A seat adjuster mechanism comprising a base adapted to be securely fastened to the floor of a vehicle and extending from front to rear thereof, a track assembly spaced above and arranged substantially parallel to said base comprising a track and a slide for the seat, said slide being movable with respect to said track, a pair of substantially vertically extending actuating mechanisms mounted on said fixed base adjacent the front and rear ends thereof in the space between said base and track assembly for supporting said track assembly above said base, said actuating mechanisms each comprising a threaded support member and a threaded nut member mounted on said threaded support member for relative movement therebetween, means operatively connecting the nut member of each mechanism to said track, means mounting said support member of each mechanism on said base for rotation only, power operated means for driving the support member of each mechanism in rotation with respect to the corresponding nut member to vertically position the track assembly, a downwardly extending bracket connected to said slide, a horizontally extending rack pivotally connected on one end to said bracket, said rack having teeth along one edge and a straight rear edge opposite and parallel to its toothed edge, a pinion in mesh with the teeth on said rack, and a rack retainer mounted for swinging movement about the axis of said pinion, said rack retainer having means slidably engaging the straight rear edge of said rack to retain it in proper mesh with said pinion while providing for angular movement about the axis of said pinion as well as longitudinal movement thereof resulting from rotation of said pinion, and drive means operatively connected to said pinion.

9. A seat adjuster mechanism comprising a base adapted to be securely fastened to the floor of a vehicle and extending from front to rear thereof, a track assembly spaced above and arranged substantially parallel to said base comprising a track and a slide for the seat, said slide being movable with respect to said track, a pair of substantially vertically extending actuating mechanisms mounted on said fixed base adjacent the front and rear ends thereof in the space between said base and track assembly for supporting said track assembly above said base, said actuating mechanisms each comprising a tubular housing fixed to said base, a threaded support member mounted in said housing for rotation only, a threaded nut mounted on said support member in said housing for relative movement therebetween, a tubular elongated element surrounding said support member and having a surface abutting said nut, means connecting the elongated element of each mechanism to said track, power operated means for driving said support member in rotation to axially displace said nut and elongated element to vertically position said track assembly, a downwardly extending bracket connected to said slide, a horizontally extending rack pivotally connected on one end to said bracket, said rack having teeth along one edge and a straight rear edge opposite and parallel to its toothed edge, a pinion in mesh with the teeth on said rack, and a rack retainer mounted for swinging movement about the axis of said pinion, said rack retainer having means slidably engaging the straight rear edge of said rack to retain it in proper mesh with said pinion while providing for angular movement about the axis of said pinion as well as longitudinal movement thereof resulting from rotation of said pinion, and drive means operatively connected to said pinion.

10. The mechanism defined in claim 9 wherein said drive means includes a worm and worm gear connected to said pinion.

11. The mechanism defined in claim 10 wherein a flexible drive cable is connected to said worm.

12. The mechanism defined in claim 9 wherein said rack retainer includes bearing means engageable with the straight rear edge of said rack to retain it fully meshed with said pinion during swinging movement of said rack about the axis of said pinion.

13. A seat adjuster mechanism comprising a base adapted to be securely fastened to the floor of a vehicle and extending from front to rear thereof, a track assembly spaced above and arranged substantially parallel to said base comprising a track and a slide for the seat, said slide being movable with respect to said track, a pair of substantially vertically extending actuating mechanisms mounted on said fixed base adjacent the front and rear ends thereof in the space between said base and track assembly for supporting said track assembly above said base, said actuating mechanisms each comprising a threaded support member and a threaded nut member mounted on said threaded support member for relative movement therebetween, first means operatively connecting one of said members of each mechanism to said track, second means operatively connecting the other member to said fixed base, said first means being effective to hold said track against substantial lengthwise displacement, power operated means to drive the other member of each mechanism with respect to the corresponding member to vertically position said track and said slide, a bracket connected to said slide, a rack connected to said bracket, a pinion in mesh with the teeth of said rack, and a rack retainer mounted for swinging movement about said pinion, said rack retainer having means slidably engaging said rack to retain it in proper mesh with said pinion, said power operated means being drivingly connected to said pinion to move said rack and slide.

14. A seat adjuster mechanism comprising a base adapted to be securely fastened to the floor of a vehicle and extending from front to rear thereof, a track assembly spaced above and arranged substantially parallel to said base comprising a track and a slide for the seat, said slide being movable with respect to said track, a pair of substantially vertically extending actuating mechanisms mounted on said fixed base adjacent the front and rear ends thereof in the space between said base and track assembly for supporting said track assembly above said base, said actuating mechanisms each comprising a threaded support member and a threaded nut member mounted on said threaded support member for relative movement therebetween, first means operatively connecting one of said members of each mechanism to said track, second means operatively connecting the other member to said fixed base, said first means being effective to hold said track against substantial lengthwise displacement, power operated means to drive the other member of each mechanism with respect to the corresponding member to vertically position said track and said slide, a downwardly extending bracket connected to said slide, a horizontally extending rack connected on one end to said bracket, a pinion in mesh with the teeth of said rack, and a rack retainer mounted for swinging movement about the axis of said pinion, said rack retainer having means slidably engaging the rear edge of said rack to retain it in proper mesh with said pinion, said power operated means being drivingly connected to said pinion to move said rack and slide horizontally.

15. A seat adjuster mechanism comprising a base adapted to be securely fastened to the floor of a vehicle and extending from front to rear thereof, a track assembly spaced above and arranged substantially parallel to said base comprising a track and a slide for the seat, said slide being movable with respect to said track, a pair of substantially vertically extending actuating mechanisms mounted on said fixed base adjacent the front and rear ends thereof in the space between said base and track assembly for supporting said track assembly above said base, said actuating mechanisms each comprising a threaded support member and a threaded nut member mounted on said threaded support member for relative movement therebetween, first means operatively connecting one of said members of each mechanism to said track, second means operatively connecting the other member to said fixed base, said first means being effective to hold said track against substantial lengthwise displacement, power operated means to drive the other member of each mechanism with respect to the corresponding member to vertically position said track and said slide, a downwardly extending bracket connected to said slide, a horizontally extending rack connected on one end to said bracket, said rack having teeth along one edge and a straight rear edge opposite and parallel to its toothed edge, a pinion in mesh with the teeth of said rack, and a rack retainer mounted for swinging movement about the axis of said pinion, said rack retainer having means slidably engaging the rear edge of said rack to retain it in proper mesh with said pinion while providing for angular movement about the axis of said pinion as well as longitudinal movement thereof resulting from rotation of said pinion, and drive means operatively connected to said pinion.

16. The mechanism defined in claim 15 wherein said drive means includes a worm and worm gear connected to said pinion.

17. The mechanism defined in claim 16 wherein a flexible drive cable is connected to said worm.

18. The mechanism defined in claim 15 wherein said rack retainer includes bearing means engageable with the straight rear edge of said rack to retain it fully meshed with said pinion during swinging movement of said rack about the axis of said pinion.

References Cited by the Examiner
UNITED STATES PATENTS

| | | | |
|---|---|---|---|
| 2,886,094 | 5/1959 | Pickles | 248—393 |
| 2,930,428 | 3/1960 | De Rose | 248—394 |
| 3,033,510 | 5/1962 | Hollar et al. | 248—394 |
| 3,034,759 | 5/1962 | Carlson et al. | 248—393 |
| 3,036,806 | 5/1962 | Zibbell | 248—393 |

CLAUDE A. LE ROY, *Primary Examiner.*

FRANK L. ABBOTT, *Examiner.*